B. DARROW.
VULCANIZING APPARATUS.
APPLICATION FILED JULY 29, 1916.
1,317,661. Patented Sept. 30, 1919.
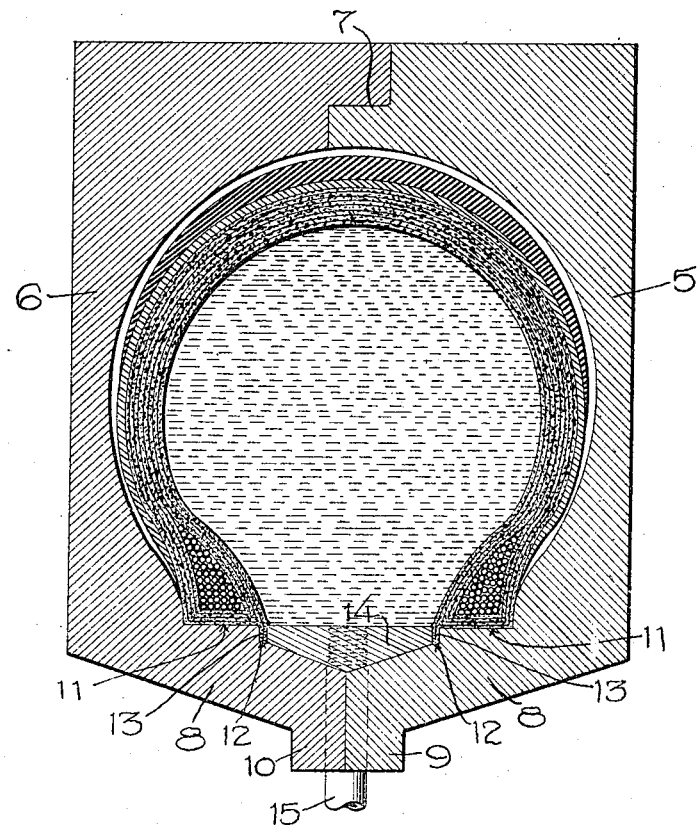
Witness
R. F. Trogner.
Inventor
Burgess Darrow.
By C. L. Landon,
Attorney

UNITED STATES PATENT OFFICE.

BURGESS DARROW, OF AKRON, OHIO, ASSIGNOR TO THE GOODYEAR TIRE & RUBBER COMPANY, OF AKRON, OHIO, A CORPORATION OF OHIO.

VULCANIZING APPARATUS.

1,317,661.

Specification of Letters Patent. Patented Sept. 30, 1919.

Application filed July 29, 1916. Serial No. 112,029.

*To all whom it may concern:*

Be it known that I, BURGESS DARROW, a citizen of the United States, residing at Akron, in the county of Summit and State of Ohio, have invented new and useful Improvements in Vulcanizing Apparatus, of which the following is a specification.

My present invention relates to improvements in molds and in methods of curing pneumatic tires therein by means of hydraulic expansion.

The first attempts to secure proper expansion of a pneumatic tire within its mold by the use of a hydraulic expanding medium were but partially successful, owing to the leakage of the expanding fluid around the bull ring, which resulted from the fact that the bull ring, as customarily employed, spaces the lower portions of the two mold parts in separation of the toes of the tire. It was also a defect in this practice that the beads of the tire were very frequently of varying width throughout their length, as their toe edges were not uniformly compressed against the mold.

Subsequent practice evolved the formation of a flap along the edge of each tire toe, which was compressed between the sides of the bull ring and the mold parts, which latter were tightened down upon the bull ring. This edge flap was a continuation of the fabric of the tire and served to cure preceding practice of the above noted defects to a limited extent. Leakage of the expanding fluid was prevented in a large degree and the beads were much more uniform owing to the fact that their toe edges were anchored at the edges of the bull ring, which obviated the former uneven compression of certain areas of the beads.

This subsequent practice, however, was itself susceptible of improvement, and it is the object of the present invention to so modify the method of employing the edge flap along the toes of the tire, that all of the defects in prior methods are completely eliminated.

More specifically, it is the object of my invention to employ a bull ring and mold construction such that the opposite mold parts abut below the bull ring, in providing a seat therefor. By means of this construction, the fabric flaps protruding from the toe edges of the tire are interpositioned between the lateral edges of the bull ring and opposite walls of toe flap receiving recesses of the mold parts without being required to bear the entire compression formerly effective thereon upon closing of the mold.

The above and additional objects of a similar nature, which will be hereinafter more specifically treated, may be accomplished by such means as are illustrated in the accompanying drawings, described in the following specification and then more particularly pointed out in the claims which are appended hereto and form a part of this application.

The figure is a transverse sectional view taken through a mold in which there is positioned a tire carcass in readiness for its vulcanization in accordance with the improvements comprehended by this invention.

The mold illustrated is composed of opposite mating portions 5 and 6, which, along their outer circumference, interlock in the customary manner as indicated at 7 and, as preferably provided by this invention, are brought into registry along their inner circumferences by the provision of converging base portions or flanges 8—8, which terminate in mating annuli 9 and 10, adapted to abut when the mold is closed.

The base portions 8—8 are provided with interior seats 11 for the reception of the toes of the tire carcass, such seats being somewhat narrower than the toes for which they form a support, being cut down to provide recesses which are offset from the seats 11 and are adapted to receive the toe flaps 13 of the tire. A bull ring 14 is disposed within the mold and has its inner face formed to fit the inwardly converging faces of the base portions 8—8 which thus present the V shaped annulus illustrated. The usual valve 15 extends through the bull ring and also through the mating annuli 9 and 10 of the mold bases.

The width of the bull ring is so determined with respect to the mold in which it is to be seated that it extends only between the recesses 12 provided for the reception of the toe flaps, and is spaced from contact with the opposite toe-seating annuli 11 permitting the flaps 13 to be received between the sides of the bull ring and the walls of the recesses 12.

Owing to this structural arrangement of the mold and bull ring, the toe flaps 13 do not bear the full force of the compression produced by an approach of the mold parts 5 and 6 to their mating position. The abutting annuli 9 and 10 of the base faces are formed to bear the greater part of this compression so that the bull ring is given a snug fit when within its mold seat by the interposition of the flaps 13. The snug fit is ample to prevent any leakage of the fluid of expansion around the bull ring, and is sufficient to readily clamp the toes of the tire in such manner that the base faces of the beads will not be forced to assume any irregularities of formation.

On the other hand, the flaps 13 are not crushed in the manner found to be the almost inevitable result of spacing the mold parts by the bull ring, and of spacing the bull ring from the mold parts by these edge flaps. In accordance with the method which this invention seeks to improve, the flaps were often so severely injured, during the forcing together of the mold parts, as not to be capable of performing their leak-preventing and bead-straightening functions. The present invention has cured this fault by permitting the lower parts of the mold to register directly with each other and to form a seat for the bull ring in the manner just described.

What I claim is:

1. A tire vulcanizing mold comprising opposite mating parts provided with base portions formed interiorly with seats for the toes of the tire, said base portions having interiorly thereof faces which converge inwardly toward each other to form a seat, and a ring having one face formed to fit said seat and its sides adapted to engage said tire.

2. A tire vulcanizing mold comprising opposite mating parts provided with abutting base portions formed interiorly with seats for the toes of the tire, said portions having interiorly thereof faces which converge inwardly toward each other to form a V-shaped seat, and a bull-ring having one face formed to fit said V-shaped seat and its sides adapted to engage said tire.

3. In a mold for use in vulcanizing tire casings of the type having annular flaps extending from the toes of the beads inwardly toward the axis of the tire, complemental mold sections adapted when assembled to abut along both their inner and outer circumferences; inwardly extending annular base plates formed on the inner portions of the mold sections, said base plates having inclined inner faces which converge in the direction of the axis of the mold forming a cross-sectional V-shaped trough interiorly of the mold; annular seats formed at the junction of the base plates and the body portion of the mold sections to receive the tire beads when the tire is placed in the mold; parallel annular ledges extending between the said annular bead seats and the inclined faces of the base plates; a bull ring having outwardly inclined surfaces defining its inner circumference, said inclined surfaces of the bull ring being adapted to seat upon the inclined faces of the base plates; and inwardly projecting annular flanges formed on the base plates and arranged to abut when the mold sections are assembled to cause the spacing of the sides of the bull ring from the ledges to such a degree that the flaps of the tire may be snugly clamped between the ledges and the side faces of the bull ring but not injured through severity of compression.

4. A tire vulcanizing mold comprising opposite mating parts provided with base flanges formed interiorly with seats for the toes of the tire, the flanges being provided interiorly thereof with faces which converge inwardly toward each other to form a seat, and said flanges having recesses to receive flaps on said toes, and a ring having its inner face formed to fit said seat and its sides adapted to engage said flaps.

5. A tire vulcanizing mold comprising opposite mating parts provided with abutting base flanges formed interiorly with seats for the toes of the tire, the base flanges being provided interiorly thereof with faces which converge inwardly toward each other to form a V-shaped seat, and said flanges having recesses to receive flaps on said toes, and a bull-ring having its inner face formed to fit said V-shaped seat and its sides adapted to engage said flaps.

6. A tire vulcanizing mold comprising opposite mating parts provided with abutting base flanges formed interiorly with seats for the toes of the tire, the flanges being provided interiorly thereof with faces which converge inwardly toward each other to form a seat, and said flanges having flap receiving recesses disposed between the last named seat and the toe seats, and a ring having its inner face formed to fit said seat and its sides adapted to press flaps on said toes against the walls of said recesses.

7. A tire vulcanizing mold comprising opposite mating parts provided with base flanges terminating in abutting annuli at the inner circumference of the mold and formed interiorly with seats for the toes of the tire, said flanges having interiorly thereof faces which converge inwardly toward each other to form a seat, and a ring having its inner face formed to fit said seat and its sides adapted to engage said tire.

8. A tire vulcanizing mold comprising opposite mating parts provided with base flanges terminating in abutting annuli at the inner circumference of the mold and formed interiorly with seats for the toes of the tire, the flanges being provided interiorly thereof with faces which converge inwardly toward each other to form a seat, and said flanges having flap receiving recesses disposed between the last named seat and the toe seats, and a ring having its inner face formed to fit said seat and its sides adapted to press flaps on said toes against the walls of said recesses.

9. A tire vulcanizing mold comprising opposite mating parts provided with base flanges terminating in abutting annuli at the inner circumference of the mold and formed interiorly with seats for the toes of the tire, the flanges being provided interiorly thereof with faces which converge inwardly toward each other to form a V-shaped seat, and said flanges having flap receiving recesses disposed between the last named seat and the toe seats, said recesses being offset from said toe seats, and a ring having its inner face formed to fit said V-shaped seat and its sides adapted to press flaps on said toes against the walls of said recesses.

10. A tire vulcanizing mold comprising opposite mating parts having abutting converging base flanges, said base flanges being formed interiorly with seats for the toes of the tire carcass and with flap receiving recesses which are offset from the seats and provide abutments for flaps on the toes of the tire, said seats being somewhat narrower than the toes for which they form a support, said flanges having interiorly thereof faces which converge toward each other and form a seat, and a bull-ring having its inner face formed to fit on said seat and its sides adapted to press said flaps against said abutments.

11. A tire vulcanizing apparatus comprising mating mold sections abutting adjacent their inner and outer circumferences to bear the force of compression, each section having a tire bead toe-engaging surface, an inwardly inclined ring-engaging surface, and a toe-flap-engaging surface between the ring and the toe-engaging surfaces, and a bull-ring seated on the ring-engaging surfaces and adapted to engage flaps on the tire bead disposable between the sides of the bull ring and the flap engaging surfaces of the mold sections.

In testimony whereof I have signed my name in the presence of two subscribing witnesses.

BURGESS DARROW.

Witnesses:
L. E. WAGNER,
F. C. ROTHROCK.